US012535817B2

(12) United States Patent
Yin et al.

(10) Patent No.: US 12,535,817 B2
(45) Date of Patent: Jan. 27, 2026

(54) INFORMATION COLLECTION METHOD, DEVICE AND STORAGE MEDIUM

(71) Applicant: ECOVACS ROBOTICS CO., LTD., Suzhou (CN)

(72) Inventors: Huihui Yin, Suzhou (CN); Junjie Shan, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 464 days.

(21) Appl. No.: 17/925,269

(22) PCT Filed: Apr. 13, 2021

(86) PCT No.: PCT/CN2021/087007
§ 371 (c)(1),
(2) Date: Nov. 14, 2022

(87) PCT Pub. No.: WO2021/227748
PCT Pub. Date: Nov. 18, 2021

(65) Prior Publication Data
US 2023/0195130 A1 Jun. 22, 2023

(30) Foreign Application Priority Data
May 15, 2020 (CN) .......................... 202010413398.7

(51) Int. Cl.
*G05D 1/00* (2024.01)

(52) U.S. Cl.
CPC ........... *G05D 1/024* (2013.01); *G05D 1/0214* (2013.01); *G05D 1/0223* (2013.01); *G05D 1/0274* (2013.01)

(58) Field of Classification Search
CPC .... G05D 1/024; G05D 1/0214; G05D 1/0223; G05D 1/0274; G05D 1/0248;
(Continued)

(56) References Cited

U.S. PATENT DOCUMENTS 5,684,695 A 11/1997 Bauer
2014/0190514 A1* 7/2014 Lamon ................... G05D 1/024
134/6
(Continued)

FOREIGN PATENT DOCUMENTS

CN 105334847 A 2/2016
CN 106997721 A 8/2017
(Continued)

OTHER PUBLICATIONS

Original and Machine translation of CN 209587942 U (Year: 2019).*
(Continued)

*Primary Examiner* — Frederick M Brushaber
(74) *Attorney, Agent, or Firm* — Maschoff Brennan

(57) ABSTRACT

Disclosed are an information collection method, a device and a storage medium. An autonomous mobile device may collect environmental information by means of a structured light module, and may collect, in a supplementary manner, obstacle information within a blind area range of the structured light module by executing an omission remediation action, such that the autonomous mobile device detects richer and more accurate environmental information during a task execution process, thereby avoiding omitting information of lower obstacles. The obstacles can be avoided and an environmental map can be constructed according to the detected obstacle information, thereby providing a foundation for subsequent working task execution and obstacle avoidance.

5 Claims, 10 Drawing Sheets

(58) Field of Classification Search
CPC .. G05D 1/0236; G05D 1/0242; G05D 1/0251; G05D 1/0261; G05D 1/0276; G05D 1/028; G01S 2013/9315; G01S 17/931; G01S 11/12; G01C 21/005
See application file for complete search history.

(56) References Cited

U.S. PATENT DOCUMENTS

| | | | |
|---|---|---|---|
| 2016/0306358 A1* | 10/2016 | Kang | G05D 1/0248 |
| 2017/0336796 A1* | 11/2017 | Jun | A47L 9/0472 |
| 2018/0113200 A1* | 4/2018 | Steinberg | G08G 1/166 |
| 2018/0120852 A1 | 5/2018 | Cho | |
| 2019/0049968 A1* | 2/2019 | Dean | G05D 1/0255 |
| 2019/0049977 A1* | 2/2019 | Dean | G05D 1/0244 |
| 2019/0196485 A1 | 6/2019 | Li | |
| 2020/0042005 A1 | 2/2020 | Xiong | |
| 2020/0133302 A1* | 4/2020 | Hillen | G05D 1/0282 |
| 2020/0183404 A1* | 6/2020 | Lin | G01S 15/88 |

FOREIGN PATENT DOCUMENTS

| | | | |
|---|---|---|---|
| CN | 207752371 U | 8/2018 | |
| CN | 109407670 A | 3/2019 | |
| CN | 110427023 A * | 11/2019 | G05D 1/024 |
| CN | 110502019 A | 11/2019 | |
| CN | 209587942 U * | 11/2019 | |
| CN | 110597260 A | 12/2019 | |
| CN | 110960138 A | 4/2020 | |
| CN | 111093019 A | 5/2020 | |
| CN | 111142526 A | 5/2020 | |
| CN | 111708360 A | 9/2020 | |
| DE | 102017120218 A1 | 3/2019 | |
| JP | 2005144606 A | 6/2005 | |
| JP | 2014062931 A | 4/2014 | |
| JP | 2017062702 A | 3/2017 | |
| JP | 2019175128 A | 10/2019 | |

OTHER PUBLICATIONS

Original and Machine translation of CN 110427023 A (Year: 2019).*
Chinese Office Action dated Mar. 29, 2022 as received in application No. 202010413398.7.
Chinese Office Action dated May 30, 2025 as received in application No. 202310073743.0.
CN Notice of Allowance dated Nov. 6, 2025 in application No. 202310073743.0.

* cited by examiner

INFORMATION COLLECTION METHOD, DEVICE AND STORAGE MEDIUM

CROSS-REFERENCE TO RELATED APPLICATIONS

The present disclosure refers to Chinese Patent Application No. 202010413398.7, filed on May 15, 2020, and entitled "Information Collection Method, Device and Storage Medium", which is hereby incorporated by reference in its entirety.

TECHNICAL FIELD

The present disclosure relates to the technical field of artificial intelligence, and in particular, to an information collection method, a device and a storage medium.

BACKGROUND

With the development of an artificial intelligence technology, robots gradually enter people's daily life and bring great convenience to people's life. For example, floor sweeping robots are able to automatically clean rooms, thereby saving a lot of manpower and material costs.

The existing floor sweeping robots are usually provided with sensors such as laser radars or cameras, which are used to collect periodic environmental information so as to construct environmental maps or avoid obstacles during a traveling process. However, sensors on the existing floor sweeping robots may not be able to detect some low obstacles on the ground, and therefore, problems such as collision and entanglement are likely caused during a sweeping or moving process.

SUMMARY

Various aspects of the present disclosure provide an information collection method, a device and a storage medium, so as to solve the problem of an autonomous mobile device being unable to detect low obstacles during a traveling process, and improve the richness and accuracy of collecting environmental information.

An embodiment of the present disclosure provides an environmental information collection method, which is applicable to an autonomous mobile device and includes: collecting obstacle information within a front area using a structured light module on an autonomous mobile device during a traveling process; executing, outside a blind area range of the structured light module, an omission remediation action for the blind area range by the autonomous mobile device in a case where the structured light module has collected the obstacle information; and collecting, in a supplementary manner, obstacle information within the blind area range using the structured light module during the process of executing the omission remediation action.

An embodiment of the present disclosure also provides an autonomous mobile device, which includes: a device body. The device body is provided with a structured light module, a processor, and a memory storing a computer program. The processor is configured to execute the computer program for: collecting obstacle information within a front area using a structured light module during a traveling process of the autonomous mobile device; executing, outside a blind area range of the structured light module, an omission remediation action for the blind area range in a case where the structured light module has collected the obstacle information; and collecting, in a supplementary manner, obstacle information within the blind area range using the structured light module during the process of executing the omission remediation action.

An embodiment of the present disclosure also provides a computer-readable storage medium storing a computer program. The computer program, when executed by a processor, causes the processor to implement at least the following actions: collecting obstacle information within a front area using a structured light module during a traveling process of an autonomous mobile device; executing, outside a blind area range of the structured light module, an omission remediation action for the blind area range in a case where the structured light module has collected the obstacle information; and collecting, in a supplementary manner, obstacle information within the blind area range using the structured light module during the process of executing the omission remediation action.

In the embodiments of the present disclosure, an autonomous mobile device can collect environmental information by means of a structured light module, and can collect, in a supplementary manner, obstacle information within a blind area range of the structured light module by executing an omission remediation action, such that the autonomous mobile device detects richer and more accurate environmental information during a task execution process, thereby avoiding omitting information of lower obstacles. Further, the obstacles can be avoided and an environmental map can be constructed according to the detected obstacle information, thereby providing a foundation for subsequent working task execution and obstacle avoidance.

BRIEF DESCRIPTION OF THE DRAWINGS

The accompanying drawings described herein are used to provide a further understanding of the present disclosure, and constitute a part of the present disclosure. Exemplary embodiments of the present disclosure and the description thereof are used to explain the present disclosure, but do not constitute improper limitations to the present disclosure. In the drawings.

DETAILED DESCRIPTION OF EXAMPLE EMBODIMENTS

In order to make the objects, technical solutions and advantages of the present disclosure clearer, the technical solutions of the present disclosure will be clearly and completely described below in conjunction with specific embodiments of the present disclosure and the corresponding drawings. It is obvious that the described embodiments are only a part of the embodiments of the present disclosure, rather than all the embodiments. All other embodiments obtained by those ordinarily skilled in the art based on the embodiments in the present disclosure without involving creative efforts fall within the scope of protection of the present disclosure.

Aiming at the problem that existing autonomous mobile devices may not be able to collect information of low obstacles, in the embodiments of the present disclosure, an autonomous mobile device is provided with a structured light module. By using the structured light module with depth information, surrounding environmental information is collected, whereby information of low obstacles can be accurately detected during a traveling process, which is beneficial to improving the richness and accuracy of environmental information collected by the autonomous mobile device, and further beneficial to obstacle avoidance and environmental map construction during the traveling process of the autonomous mobile device.

Figure 1A:
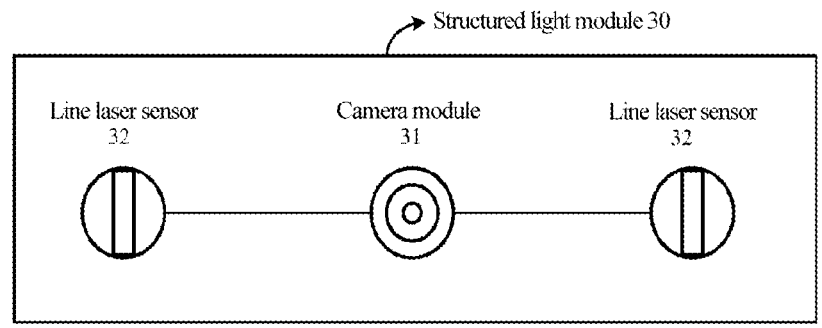
FIG. 1a is a schematic structural diagram of a structured light module according to an embodiment of the present disclosure.

Before describing the solution of the embodiments of the present disclosure, the structured light module will be briefly introduced at first. In the embodiments of the present disclosure, the structured light module is arranged on the autonomous mobile device. For example, the structured light module may be arranged right ahead of, on the left or right of, or behind the autonomous mobile device, etc. and is configured to collect surrounding environmental information during the traveling process of the autonomous mobile device. FIG. 1a is a schematic structural diagram of a structured light module according to an embodiment of the present disclosure. As shown in FIG. 1a, a structured light module 30 includes a camera module 31 and line laser sensors 32 distributed on both sides of the camera module 31.

In the structured light module 30, the line laser sensors 32 are used to emit out line laser, and the camera module 31 is responsible for collecting an environmental image detected by the line laser. The line laser emitted out by the line laser sensors 32 is located within a field of view of the camera module 31, the line laser may assist in detecting information such as the contour, height and/or width of an object within the field of view of the camera module, and the camera module 31 may collect the environmental image detected by the line laser. In various embodiments of the present disclosure, the environmental image collected by the camera module 31 includes laser line segments formed after the line laser comes into contact with the ground or the surface of an object.

The field of view of the camera module 31 includes a vertical field of view and a horizontal field of view. In the present embodiment, the field of view of the camera module 31 is not limited, and the camera module 31 having an appropriate field of view may be selected according to application requirements. As long as the line laser emitted out by the line laser sensors 32 is located within the field of view of the camera module 31, an angle between a laser line segment formed by the line laser on the surface of the object and a horizontal plane is not limited. For example, the line laser may be parallel or perpendicular to the horizontal plane, and may also form any angle with the horizontal plane, which may be specifically determined according to application requirements.

In the embodiments of the present disclosure, the implementation form of the line laser sensors 32 is not limited, and may be any device/product form capable of emitting line laser. For example, the line laser sensors 32 may be, but are not limited to, laser tubes. Similarly, the implementation form of the camera module 31 is not limited. Any visual device capable of collecting an environmental image is applicable to the embodiments of the present disclosure. For example, the camera module 31 may include, but is not limited to, a monocular camera, a binocular camera, etc.

In the embodiments of the present disclosure, a wavelength of the line laser emitted by the line laser sensors 32 is not limited, and the color of the line laser may be different depending on the wavelength. For example, the laser may be red laser, violet laser, etc. Accordingly, the camera module 31 may be a camera module 31 capable of collecting the line laser emitted out by the line laser sensors 32. The camera module 31 may also be an infrared camera, an ultraviolet camera, a starlight camera, a high-definition camera, etc. for example, adapted to the wavelength of the line laser emitted by the line laser sensors 32.

In the embodiments of the present disclosure, the number of line laser sensors 32 is not limited, and may be two or more, for example. The number of line laser sensors 32 distributed on each side of the camera module 31 is also not limited, and the number of line laser sensors 32 on each side of the camera module 31 may be one or more. In addition, the number of line laser sensors 32 on both sides may be the same or different. FIG. 1a illustrates, but is not limited to, arrangement of one line laser sensor 32 on each side of the camera module 31. For another example, two, three, or five line laser sensors 32 are arranged on the left and right sides of the camera module 31. Certainly, in the embodiments of the present disclosure, installation positions, installation angles, etc. of the line laser sensors 32 and an installation position relationship between the line laser sensors 32 and the camera module 31 are not limited.

In addition, in the embodiments of the present disclosure, the distribution pattern of the line laser sensors 32 on both sides of the camera module 31 is not limited, and the line laser sensors may be, for example, uniformly distributed, non-uniformly distributed, symmetrically distributed, or asymmetrically distributed. The uniform distribution and the non-uniform distribution may mean that the line laser sensors 32 distributed on the same side of the camera module 31 may be uniformly distributed or non-uniformly distributed. Certainly, it is also to be understood that the line laser sensors 32 distributed on both sides of the camera module 31 are uniformly distributed or non-uniformly distributed as a whole. The symmetric distribution and the asymmetric distribution mainly mean that the line laser sensors 32 distributed on both sides of the camera module 31 are symmetrically distributed or asymmetrically distributed as a whole. The symmetry herein includes both equivalence in number and symmetry in installation position. For example, in the structured light module 30 shown in FIG. 1a, the number of line laser sensors 32 is two, and the two line laser sensors 32 are symmetrically distributed on both sides of the camera module 31.

In the embodiments of the present disclosure, an installation position relationship between the line laser sensors 32 and the camera module 31 is also not limited, and any installation position relationship in which the line laser sensors 32 are distributed on both sides of the camera module 31 is applicable to the embodiments of the present disclosure. The installation position relationship between the line laser sensors 32 and the camera module 31 is related to an application scenario of the structured light module 30. The installation position relationship between the line laser sensors 32 and the camera module 31 may be flexibly determined according to the application scenario of the structured light module 30.

Figure 1B:
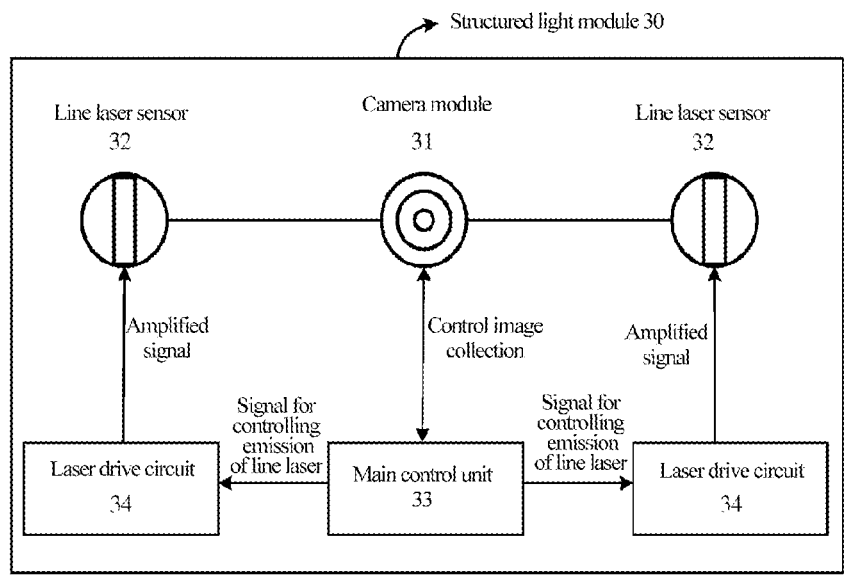
FIG. 1b is a schematic structural diagram of another structured light module according to an embodiment of the present disclosure.

Further optionally, as shown in FIG. 1B, the structured light module 30 according to an embodiment of the present disclosure may also include a main control unit 33. The main control unit 33 may control the camera module 31 and the line laser sensors 32 to work. Optionally, the main control unit 33 performs exposure control on the camera module 31 on the one hand, and may control the line laser sensors 32 to emit out line laser during exposure of the camera module 31 on the other hand, whereby the camera module 31 collects an environmental image detected by the line laser. Further, as shown in FIG. 1B, the structured light module 30 may also include a laser drive circuit 34. The laser drive circuit 34 is electrically connected to the line laser sensors 32, mainly for amplifying control signals transmitted to the line laser sensors 32. In the structured light module 30 shown in FIG. 1B, the number of laser drive circuits 34 is not limited. Different line laser sensors 32 may share one laser drive circuit 34, or one line laser sensor 32 may correspond to one laser drive circuit 34. In the structured light module 30 shown in FIG. 1B, one line laser sensor 32 corresponds to one laser drive circuit 34, and the laser drive circuit 34 is electrically connected to the line laser sensor 32. The laser drive circuit 34 is mainly used for amplifying a control signal transmitted from the main control unit 33 to the line laser sensor 32 and providing the amplified control signal to the line laser sensor 32 to control the line laser sensor 32 to work. In the embodiments of the present disclosure, a circuit structure of the laser drive circuit 34 is not limited, and any circuit structure capable of amplifying a signal and transmitting the amplified signal to the line laser sensor 32 is applicable to the embodiments of the present disclosure.

It is to be noted that the structured light module 30 may not include the control unit 33. In this case, the processor of the autonomous mobile device may be directly electrically connected to the camera module 31 and the line laser sensor 32, and directly control the camera module 31 and the line laser sensor 32 to work. Or, in a case where the structured light module 30 includes the control unit 33, the control unit 33 is electrically connected to the camera module 31 and the line laser sensor 32, and is electrically connected to the processor of the autonomous mobile device. The processor of the autonomous mobile device may indirectly control the camera module 31 and the line laser sensor 32 to work by means of the control unit 33 in the structured light module 30.

In the embodiments of the present disclosure, the structured light module 30 includes line laser sensors 32 located on the left and right sides of the camera module 31, obstacle information may be scanned within multiple planes, and distance information between the autonomous mobile device (or the structured light module 30) and a detected obstacle may also be collected. With the movement of the autonomous mobile device, the distance between the autonomous mobile device and the obstacle will change, and the distance change information will be reflected in an environmental image collected by the structured light module 30. In other words, the environmental image collected by the structured light module 30 carries depth information. Based on this depth information, not only higher obstacles can be accurately collected, but also lower obstacles can be accurately subjected to distance measurement, height measurement, identification, and three-dimensional environmental reconstruction, thereby solving the problem that the autonomous mobile device cannot detect low obstacles during a traveling process, which is beneficial to improving the richness and accuracy of environmental information collected by the autonomous mobile device, and further beneficial to more accurately avoiding the obstacle and constructing an environmental map by the autonomous mobile device based on the collected environmental information.

Figure 2A:
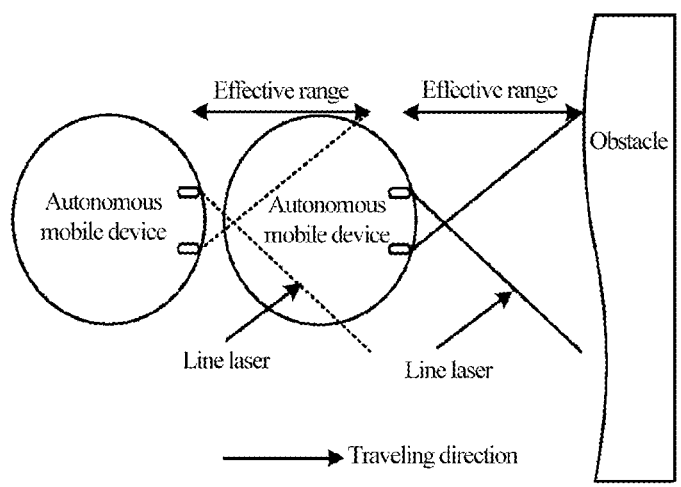
FIG. 2a is a schematic diagram of a process of an autonomous mobile device detecting an obstacle according to an embodiment of the present disclosure.
Figure 2B:
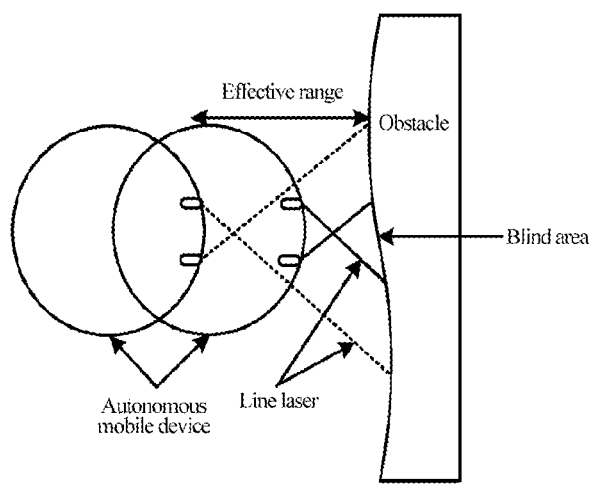
FIG. 2b is a schematic diagram of another process of an autonomous mobile device detecting an obstacle according to an embodiment of the present disclosure.

Further, as shown in FIG. 2a, since the band of the line laser emitted out by the structured light module 30 is narrow, when the structured light module is installed and used at a fixed position on the autonomous mobile device, the structured light module 30 has a certain effective range due to the limitation of the installation position and angle. The effective range at least includes the longest distance in a detectable area in front of the structured light module 30, and when the distance from an obstacle exceeds the effective range of the structured light module 30, the structured light module 30 will not be able to detect obstacle information. As shown in FIG. 2b, in the present embodiment, an area not detectable by the structured light module 30 within the effective range thereof, i.e. an area between two beams of intersecting line laser, is referred to as a blind area range of the structured light module 30, and the size of the blind area range is related to the installation position and angle of the structured light module 30 on the autonomous mobile device, the type of the line laser sensor used, etc. This is not limited. An embodiment of the present disclosure provides an environmental information collection method, which can collect, in a supplementary manner, obstacle information within a blind area range of a structured light module during a process of collecting obstacle information within a front area using the structured light module, thereby further improving the richness and accuracy of the collected obstacle information, and more comprehensively collecting environmental information. The environmental information collection method according to an embodiment of the present disclosure will be described below in detail with reference to the accompanying drawings.

Figure 3A:
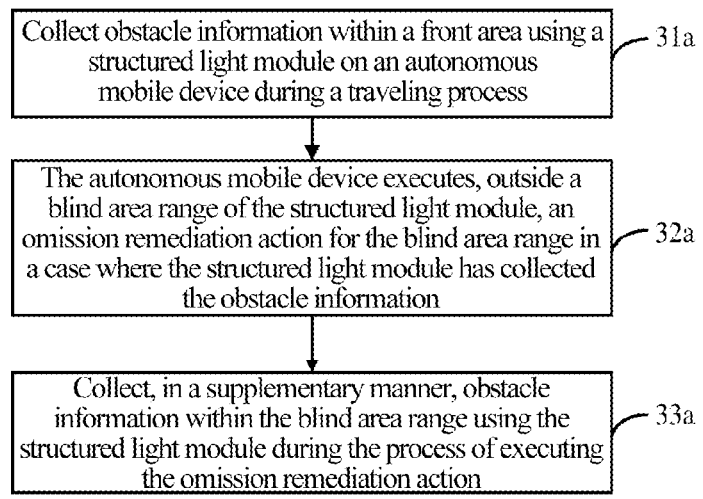
FIG. 3a is a schematic flowchart of an information collection method according to an embodiment of the present disclosure.

FIG. 3a is a flowchart of an environmental information collection method according to an embodiment of the present disclosure. The method is applicable to an autonomous mobile device. As shown in FIG. 3a, the method includes the following steps:

31a: Collect obstacle information within a front area using a structured light module on an autonomous mobile device during a traveling process.

32a: The autonomous mobile device executes, outside a blind area range of the structured light module, an omission remediation action for the blind area range in a case where the structured light module has collected the obstacle information.

33a: Collect, in a supplementary manner, obstacle information within the blind area range using the structured light module during the process of executing the omission remediation action.

In the embodiments of the present disclosure, the autonomous mobile device is provided with a structured light module, and may collect obstacle information within a front area in a traveling direction using the structured light module. It can be seen from the structure of the structured light module introduced in the above-mentioned embodiments that when the structured light module detects environmental information, line laser sensors located on both sides of a camera module emit line laser during exposure of a camera, and then the camera module collects an environmental image containing a laser line segment during the exposure. The environmental image collected by the camera module contains obstacle information detected by the line laser. Since the line laser sensors on both sides of the camera module are limited by the installation position and angle, as shown in FIG. 2b, during a traveling process of the autonomous mobile device, the structured light module may be used to collect obstacle information within an effective range thereof, but obstacle information within a blind area range of the structured light module cannot be collected. In order to more richly and accurately collect the obstacle information within the blind area range, in the embodiments of the present disclosure, the autonomous mobile device may execute, outside a blind area range of the structured light module, an omission remediation action for the blind area range in a case where the structured light module has collected obstacle information, and collect, in a supplementary manner, obstacle information within the blind area range using the structured light module during the process of executing the omission remediation action, such that the autonomous mobile device can collect richer and more complete obstacle information during the entire traveling process, thereby avoiding omitting the obstacle information within the blind area range, and providing a foundation for obstacle avoidance and/or environmental map construction in subsequent working processes.

It is to be described herein that the blind area range of the structured light module is related to the traveling direction of the autonomous mobile device, and when the traveling direction of the autonomous mobile device varies, the blind area range of the structured light module will be varying. The variation here mainly means that the direction in which the blind area range is located varies. In the embodiments of the present disclosure, the blind area range of the structured light module can be understood as: an area not detectable by the structured light module within the effective range thereof in the traveling direction of the autonomous mobile device. Based on this definition, if the structured light module detects an obstacle in a certain traveling direction of the autonomous mobile device, in order to facilitate description and distinction, the traveling direction where the autonomous mobile device is located when the structured light module detects obstacle information is taken as a target traveling direction, an omission remediation action may be executed for a blind area range of the structured light module in the target traveling direction outside the blind area range, and obstacle information within the blind area range of the structured light module in the target traveling direction may be collected in a supplementary manner using the structured light module during the process of executing the omission remediation action.

In the embodiments of the present disclosure, an omission remediation action is executed for a blind area range of the structured light module outside the blind area range, which is beneficial to fully collecting obstacle information within the blind area range. A blind area range of the structured light module may be calculated according to the installation position and angle of the structured light module in advance, and the blind area range is converted into a distance between the autonomous mobile device and the obstacle, and is recorded as a boundary distance corresponding to the blind area range. As the installation position and angle of the structured light module vary, the blind area range of the structured light module will be varying, and accordingly, the boundary distance corresponding to the blind area range will also be varying. In addition, in the embodiments of the present disclosure, the value of the boundary distance is not limited, and may be, for example, 3 cm, 5 cm, 10 cm, 0.3 m, 0.5 m, etc. The autonomous mobile device may store the boundary distance corresponding to the blind area range of the structured light module in advance. Based on this, in a case where the structured light module has collected obstacle information, a distance between the autonomous mobile device and the detected obstacle may be calculated according to the collected obstacle information. The distance is compared with a boundary distance. An omission remediation action may be executed for a blind area range of the structured light module at a current position in a case where the distance is greater than the boundary distance, and obstacle information within the blind area range may be collected in a supplementary manner using the structured light module during the process of executing the omission remediation action.

Figure 3B:
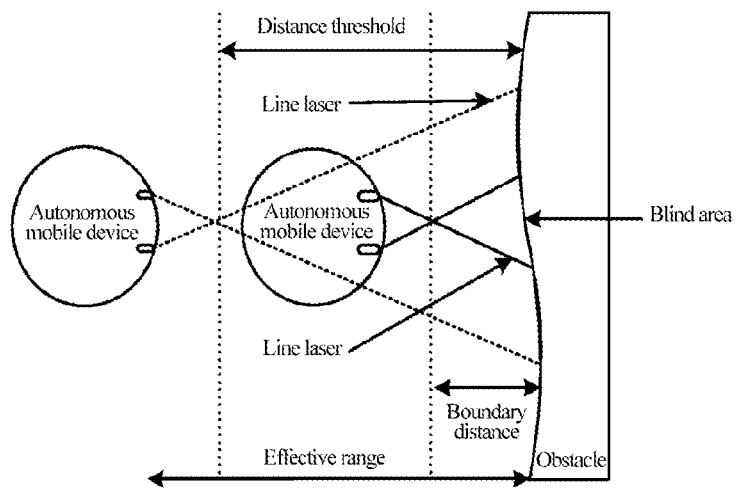
FIG. 3b is a schematic diagram of still another process of an autonomous mobile device detecting an obstacle according to an embodiment of the present disclosure.

Further, in order to execute an omission remediation action for the blind area range of the structured light module at a more reasonable position, in addition to the boundary distance, a distance threshold may also be set in the embodiments of the present disclosure. The distance threshold is also a certain distance value from the autonomous mobile device to the detected obstacle, the distance threshold is greater than the boundary distance, and a distance range is defined by the set distance threshold and the boundary distance, as shown in FIG. 3b. Based on this, when the structured light module has collected obstacle information, the autonomous mobile device may calculate a distance between the autonomous mobile device and the obstacle according to the obstacle information collected by the structured light module. When the distance is between the set distance threshold and the boundary distance corresponding to the blind area range, an omission remediation action is executed for the blind area range of the structured light module at this moment. The obstacle information within the blind area range is collected in a supplementary manner using the structured light module during the process of executing the omission remediation action, so as to ensure that the obstacle information within the blind area range can be successfully collected in a supplementary manner during the process of executing the omission remediation action, thereby avoiding that the obstacle information within the blind area range is not collectible or cannot be collected comprehensively when starting to execute the omission remediation action at a long distance.

Further, in a case where the distance between the autonomous mobile device and the obstacle is greater than or equal to the set distance threshold, the autonomous mobile device may continuously move toward the obstacle until the distance between the autonomous mobile device and the obstacle is greater than the set distance threshold and less than or equal to the boundary distance corresponding to the blind area (i.e. between the set distance threshold and the boundary distance), and execute an omission remediation action for the blind area range of the structured light module at this moment; or, in a case where the distance between the autonomous mobile device and the obstacle is less than the boundary distance corresponding to the blind area range, the autonomous mobile device moves backward away from the obstacle until the distance between the autonomous mobile device and the obstacle is between the set distance threshold and the boundary distance, and executes an omission remediation action for the blind area range of the structured light module at this moment, so as to ensure that the obstacle information within the blind area range can be successfully collected in a supplementary manner during the process of executing the omission remediation action.

In the embodiments of the present disclosure, the moving speed when the autonomous mobile device approaches the obstacle is not limited. For example, the autonomous mobile device may continuously move toward the obstacle in a uniform velocity manner, and may also continuously move toward the obstacle in a non-uniform velocity manner. The non-uniform velocity manner includes, but is not limited to, a deceleration manner or an acceleration manner. In an optional embodiment, in a case where the structured light module has detected obstacle information, if calculating that the distance between the autonomous mobile device and the obstacle is greater than the set distance threshold, the autonomous mobile device may continuously move toward the obstacle in a deceleration manner until the distance between the autonomous mobile device and the obstacle is less than the set distance threshold and greater than the boundary distance corresponding to the blind area range. For example, when the distance between the autonomous mobile device and the obstacle is equal to the sum of the boundary distance and a half width of the autonomous mobile device, an omission remediation action for the blind area range of the structured light module at this moment may be started. In addition, the deceleration manner may be a uniform deceleration or a non-uniform deceleration, and accordingly, the acceleration may be a uniform acceleration or a non-uniform acceleration.

Similarly, in the embodiments of the present disclosure, the moving speed at which the autonomous mobile device moves backward away from the obstacle is not limited. For example, the autonomous mobile device may move backward away from the obstacle in a uniform velocity manner, and may also move backward away from the obstacle in a non-uniform velocity manner. The non-uniform velocity manner includes, but is not limited to, a deceleration manner or an acceleration manner. In an optional embodiment, in a case where the structured light module has detected obstacle information, if calculating that the distance between the autonomous mobile device and the obstacle is less than the boundary distance corresponding to the blind area range, the autonomous mobile device may move backward away from the obstacle in an acceleration manner until the distance between the autonomous mobile device and the obstacle is less than the set distance threshold and greater than the boundary distance corresponding to the blind area range. For example, when the distance between the autonomous mobile device and the obstacle is equal to the sum of the boundary distance and a half width of the autonomous mobile device, an omission remediation action for the blind area range of the structured light module at this moment may be started. In addition, the deceleration manner may be a uniform deceleration or a non-uniform deceleration, and accordingly, the acceleration may be a uniform acceleration or a non-uniform acceleration.

Figure 3C:
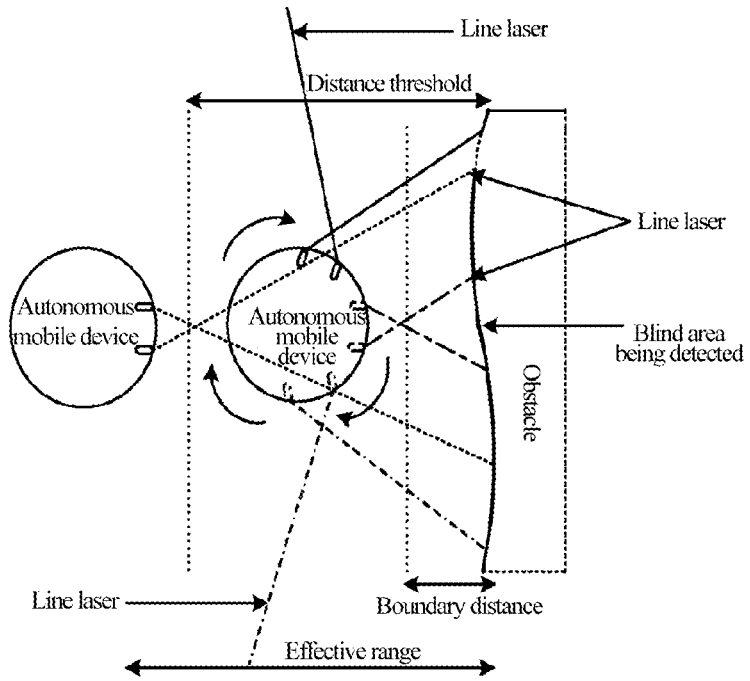
FIG. 3c is a schematic diagram of yet another process of an autonomous mobile device detecting an obstacle according to an embodiment of the present disclosure.

In the embodiments of the present disclosure, the omission remediation action executed by the autonomous mobile device, outside the blind area range of the structured light module, for the blind area range is not limited. Any action that enables the structured light module to successfully collect, during the process of executing the omission remediation action by the autonomous mobile device, the obstacle information within the blind area range before the omission remediation action is executed is applicable to the embodiments of the present disclosure. Omission remediation actions executable by the autonomous mobile device will be illustrated as follows:

Omission Remediation Action 1: The autonomous mobile device rotates in situ outside the blind area range of the structured light module in a case where the structured light module has collected obstacle information. In the present embodiment, the detection range of the structured light module can be changed by the autonomous mobile device through in-situ rotation. As the autonomous mobile device rotates, the detection range of the structured light module changes continuously, and obstacle information within the blind area range of the structured light module before the autonomous mobile device rotates in situ will be detected. A rotation direction of the autonomous mobile device is not limited herein, and the autonomous mobile device may rotate clockwise or counterclockwise. Since the structured light module emits two beams of line laser in the form of cross emission, the two laser lines will also rotate along the rotation direction during the rotation of the autonomous mobile device. As shown in FIG. 3c, the autonomous mobile device rotates clockwise in situ. During the rotation, the rear laser line will detect, along the rotation direction, the blind area range of the structured light module before the autonomous mobile device starts to rotate, so as to achieve the purpose of collecting, in a supplementary manner, obstacle information within the blind area range of the structured light module before the autonomous mobile device starts to rotate. In the embodiments of the present disclosure, the number of in-situ rotation turns of the autonomous mobile device is not limited. As the number of rotation turns of the autonomous mobile device is increased, the richness of detectable obstacle information will also be increased, and the autonomous mobile device may set a rotation turns threshold to control the number of rotation turns of the autonomous mobile device according to specific operation conditions. Further optionally, a relationship between the omission remediation action executed by the autonomous mobile device and the motion of moving toward the obstacle is not limited. For example, the autonomous mobile device may stop moving and rotate in situ at the position where the movement is stopped, or may rotate while moving to the obstacle between a preset distance threshold and a boundary distance corresponding to the blind area range. The relationship may be controlled according to specific operation conditions, and will not be limited herein.

Figure 3D:
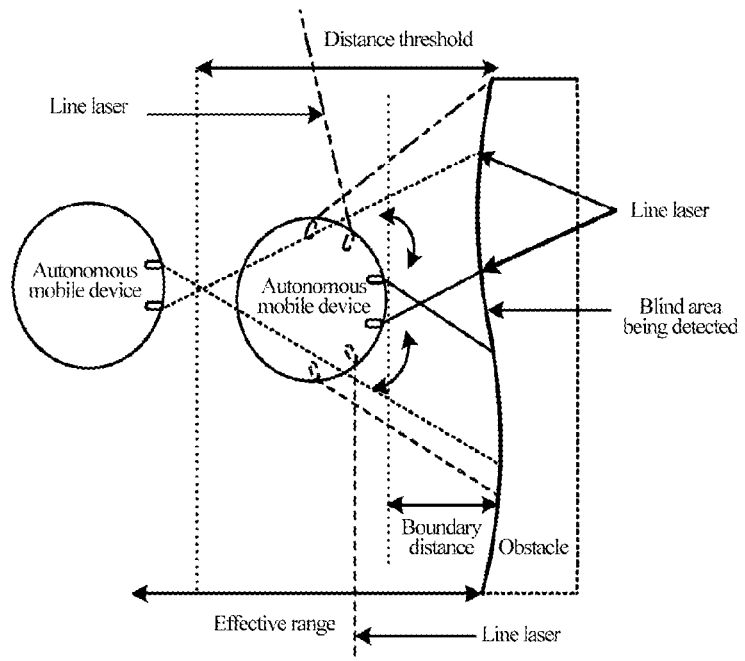
FIG. 3d is a schematic diagram of yet another process of an autonomous mobile device detecting an obstacle according to an embodiment of the present disclosure.

Omission Remediation Action 2: The autonomous mobile device rotates differentially outside the blind area range of the structured light module in a case where the structured light module has collected obstacle information. In the present embodiment, the differential rotation means that the autonomous mobile device alternately rotates left and right around a central axis thereof perpendicular to the ground in situ. The detection range of the structured light module can be changed by the autonomous mobile device through in-situ differential rotation. As the autonomous mobile device rotates differentially, the detection range of the structured light module changes continuously, and obstacle information within the blind area range of the structured light module before the autonomous mobile device rotates differentially in situ will be detected. The number of left-right rotations of the autonomous mobile device is not limited herein. For example, the autonomous mobile device may rotate left once and then rotate right once, or may rotate left multiple times and then rotate right multiple times. Further, the frequency of left-right rotation of the autonomous mobile device is not limited. For example, the frequency of left rotation of the autonomous mobile device may be the same as or different from the frequency of right rotation of the autonomous mobile device. Further, an angle at which the autonomous mobile device rotates left and right is not limited. For example, the autonomous mobile device may rotate left or right by 30°, 60°, 90°, 180°, etc. respectively. Since the structured light module emits two beams of line laser in the form of cross emission, the two laser lines will also rotate along the rotation direction during the differential rotation of the autonomous mobile device. As shown in FIG. 3d, during the in-situ differential rotation of the autonomous mobile device, the rear laser line will detect, along the rotation direction, the blind area range of the structured light module before the autonomous mobile device starts to rotate, so as to achieve the purpose of collecting, in a supplementary manner, obstacle information within the blind area range of the structured light module before the autonomous mobile device starts to rotate. In the embodiments of the present disclosure, the number of in-situ differential rotations of the autonomous mobile device is not limited. As the number of differential rotations of the autonomous mobile device is increased, the richness of detectable obstacle information will also be increased, and the autonomous mobile device may set a differential rotation number threshold to control the number of differential rotations of the autonomous mobile device according to specific operation conditions. Further optionally, a relationship between the omission remediation action executed by the autonomous mobile device and the motion of moving toward the obstacle is not limited. For example, the autonomous mobile device may stop moving and rotate differentially in situ at the position where the movement is stopped, or may rotate differentially while moving to the obstacle between a preset distance threshold and a boundary distance corresponding to the blind area range. The relationship may be controlled according to specific operation conditions, and will not be limited herein.

Omission Remediation Action 3: The autonomous mobile device moves in multiple directions outside the blind area range of the structured light module in a case where the structured light module has collected obstacle information. In the present embodiment, the detection range of the structured light module can be changed by the autonomous mobile device moving in multiple directions. As the movement and directional change of the autonomous mobile device, the detection range of the structured light module changes continuously, and obstacle information within the blind area range of the structured light module before the autonomous mobile device moves in multiple directions will be detected. A specific moving direction of the autonomous mobile device is not limited herein. It is applicable to the present embodiment as long as the direction of the autonomous mobile device can be changed, the laser lines can detect the blind area range of the structured light module before the autonomous mobile device moves, and the purpose of collecting, in a supplementary manner, obstacle information within the blind area range of the structured light module before the autonomous mobile device moves is achieved. For example, the autonomous mobile device may keep a direction directly in front of the autonomous mobile device unchanged, and move left and right along a horizontal direction perpendicular to the direction directly in front of the autonomous mobile device; or, the autonomous mobile device may move toward the obstacle in a "Z" or "S"-type trajectory; or, the autonomous mobile device may move along any irregular trajectory or the like. Since the structured light module emits two beams of line laser in the form of cross emission, the directions of the two laser lines are also changed along the moving direction during the process of the autonomous mobile device moving to multiple directions. Further, the laser lines may detect the blind area range of the structured light module before the autonomous mobile device moves, so as to collect obstacle information within the blind area range.

Omission Remediation Action 4: The autonomous mobile device moves in another direction different from a current traveling direction outside the blind area range of the structured light module in a case where the structured light module has collected obstacle information. In the present embodiment, the detection range of the structured light module can be changed by the autonomous mobile device moving in another direction different from the current traveling direction. As the movement and directional change of the autonomous mobile device, the detection range of the structured light module changes continuously, and obstacle information within the blind area range of the structured light module before the autonomous mobile device moves in another direction different from the current traveling direction will be detected. A specific moving direction of the autonomous mobile device is not limited herein. It is applicable to the present embodiment as long as the direction of the autonomous mobile device can be changed, the laser lines can detect the blind area range of the structured light module before the autonomous mobile device moves, and the purpose of collecting, in a supplementary manner, obstacle information within the blind area range of the structured light module before the autonomous mobile device moves is achieved. For example, the autonomous mobile device may move to the left side of the current traveling direction or may move to the right side of the current traveling direction, etc, by taking a front central axis of the autonomous mobile device as a boundary. Since the structured light module emits two beams of line laser in the form of cross emission, the directions of the two laser lines are also changed along the moving direction during the process of the autonomous mobile device moving in another direction different from the current traveling direction. Further, the laser lines may detect the blind area range of the structured light module before the autonomous mobile device moves, so as to collect obstacle information within the blind area range.

In the embodiments of the present disclosure, in addition to the manner of executing the omission remediation action by the autonomous mobile device mentioned in the above-mentioned embodiments, one or more of the above-mentioned manners may also be combined so as to execute the omission remediation action for the blind area range and collect the obstacle information within the blind area range. No more descriptions are made herein.

In the embodiments of the present disclosure, after collecting, in a supplementary manner, obstacle information within the blind area range using the structured light module, the autonomous mobile device may execute different actions for different scenarios. For example, the autonomous mobile device may perform obstacle avoidance according to the obstacle information collected in a supplementary manner and collected previously, and/or, construct an environmental map according to the obstacle information collected in a supplementary manner and collected previously. Specific scenario embodiments will be described below with reference to the accompanying drawings.

Scenario Embodiment 1

Figure 4A:
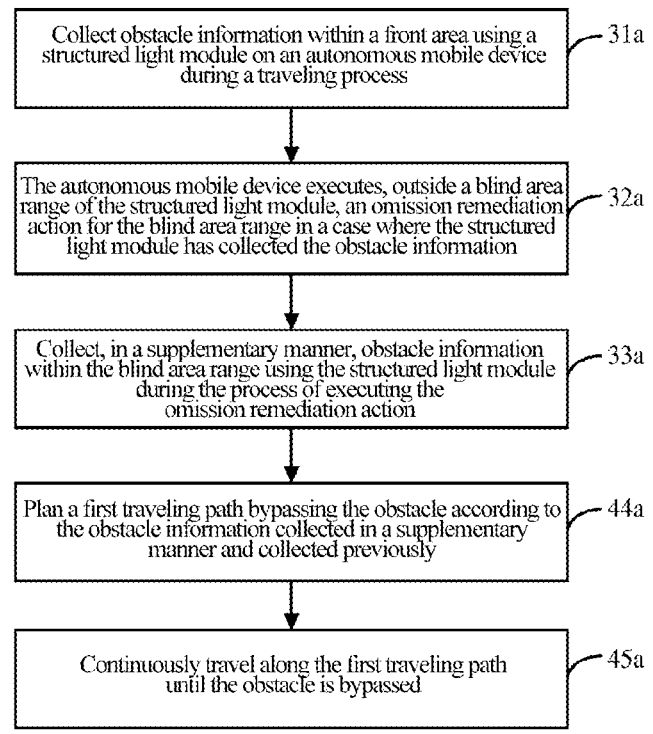
FIG. 4a is a schematic flowchart of an obstacle avoidance method according to an embodiment of the present disclosure.

FIG. 4a is a schematic flowchart of an obstacle avoidance method according to an embodiment of the present disclosure. As shown in FIG. 4a, after step 33a in FIG. 3a, the method further includes the following steps:

44a: Plan a first traveling path bypassing the obstacle according to the obstacle information collected in a supplementary manner and collected previously.

45a: Continuously travel along the first traveling path until the obstacle is bypassed, the obstacle being an obstacle corresponding to the obstacle information collected in a supplementary manner and collected previously.

In the embodiments of the present disclosure, the autonomous mobile device may obtain relatively complete information of an obstacle on one side of the autonomous mobile device according to obstacle information detected during a normal traveling process and obstacle information within the blind area range collected in a supplementary manner during the process of executing the omission remediation action. Based on this, a first traveling path bypassing the obstacle may be determined, and the autonomous mobile device continuously travels along the first traveling path until the obstacle is bypassed, so as to achieve the purpose of obstacle avoidance.

Figure 4B:
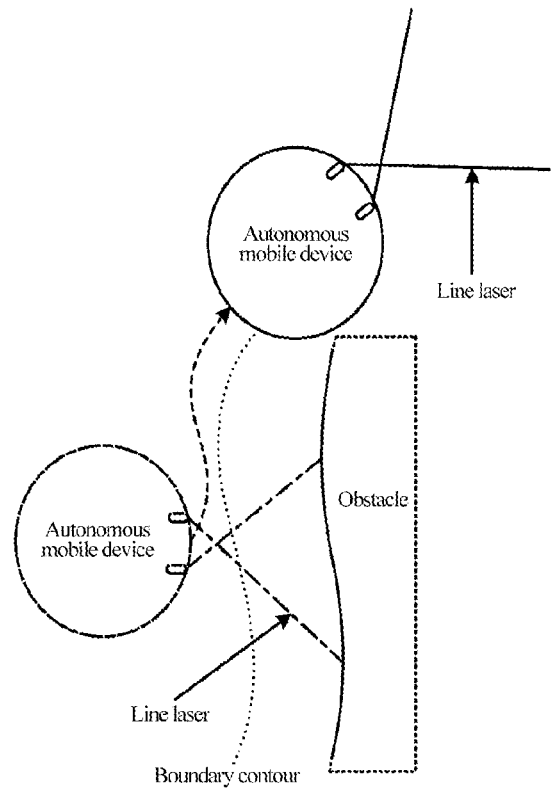
FIG. 4b is a schematic diagram of an obstacle avoidance process of an autonomous mobile device according to an embodiment of the present disclosure.

In the embodiments of the present disclosure, the implementation of planning a first traveling path bypassing the obstacle according to the obstacle information collected in a supplementary manner and collected previously is not limited. In an optional embodiment, collected points on the obstacle may be determined according to the obstacle information collected in a supplementary manner and collected previously, and the collected points on the obstacle are expanded. A boundary contour of the obstacle is determined based on the expanded points on the obstacle, and a first traveling path bypassing the obstacle is planned according to the boundary contour. For example, in an example where the autonomous mobile device differentially rotates to collect, in a supplementary manner, obstacle information within the blind area range, the autonomous mobile device determines collected points, i.e. points on solid lines in FIG. 3d, on the obstacle according to the obstacle information collected in a supplementary manner and collected previously, expands the collected points on the obstacle, and determines a boundary contour of the obstacle based on the expanded points on the obstacle, i.e. a boundary contour line as shown in FIG. 4b. Further, the autonomous mobile device plans a first traveling path according to the determined boundary contour line of the obstacle, i.e. an arrowed curve in FIG. 4b. The autonomous mobile device may bypass the obstacle by continuously traveling along the first traveling path.

In the embodiments of the present disclosure, the degree of expansion of the points on the obstacle is not limited. In order to ensure that the autonomous mobile device does not "scrape" the obstacle while traveling in an edgewise mode, the minimum degree of expansion is based on the autonomous mobile device not touching the obstacle while traveling along the obstacle. The edgewise mode means that a certain side of the autonomous mobile device travels along the obstacle. For example, the direction in which the autonomous mobile device travels is taken as a positive direction. If the autonomous mobile device travels with a left side thereof abutting against the obstacle, the mode is referred to as a left edgewise mode. If the autonomous mobile device travels with a right side thereof abutting against the obstacle, the mode is referred to as a right edgewise mode. As shown in FIG. 4b, after the autonomous mobile device detects the boundary of the obstacle, the detected points on the obstacle may be expanded to obtain a boundary contour as shown in FIG. 4b. Further, the autonomous mobile device may move toward the obstacle to reach the position of the boundary contour and continuously travel along the boundary contour in the right edgewise mode until the autonomous mobile device travels to the boundary of the obstacle and cannot detect obstacle information in a forward direction thereof, i.e. bypassing the obstacle.

In the embodiments of the present disclosure, the manner of planning a first traveling path bypassing the obstacle by the autonomous mobile device is not limited. The autonomous mobile device may plan a first traveling path and then travel along the planned first traveling path, or may plan a first traveling path while traveling. This is not limited herein. In the embodiments of the present disclosure, the manner in which the autonomous mobile device selects the direction of the first traveling path is not limited. The autonomous mobile device may determine a side where the boundary of the obstacle is detected for the first time as the direction of the first traveling path, or may select one side as the direction of the first traveling path after detecting boundaries of both sides of the obstacle through the omission remediation action, or may select a side easily passing the obstacle as the direction of the first traveling path according to surrounding environmental information of the boundaries of both sides of the obstacle. This is not limited herein.

Scenario Embodiment 2

Figure 5A:
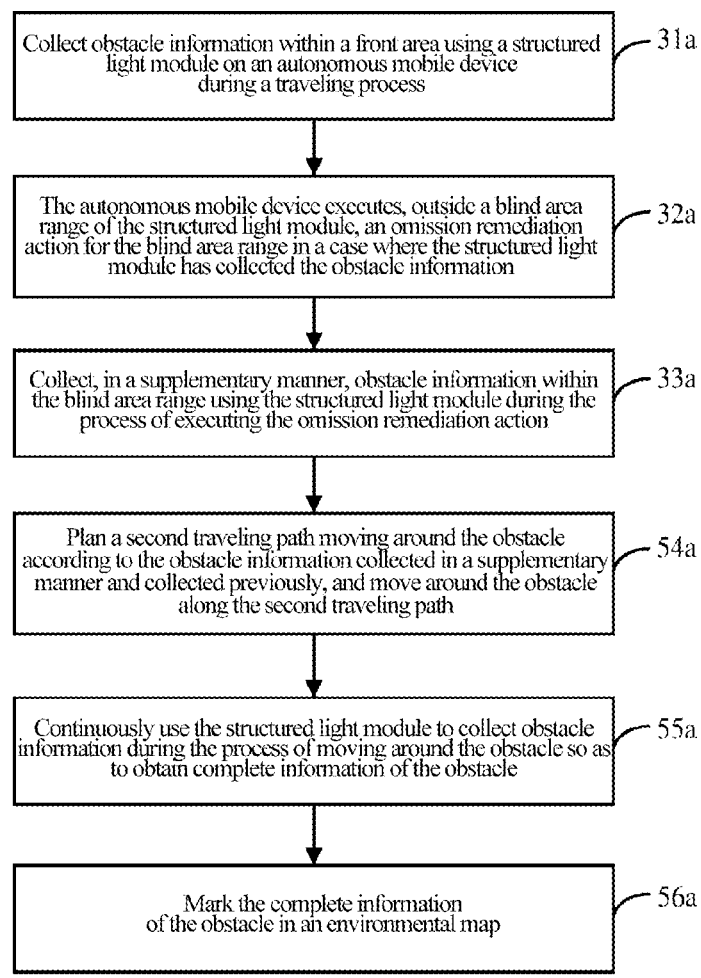
FIG. 5a is a schematic flowchart of an environmental map construction method according to an embodiment of the present disclosure.

FIG. 5a is a schematic flowchart of an environmental map construction method according to an embodiment of the present disclosure. As shown in FIG. 5a, after step 33a in FIG. 3a, the method further includes the following steps:

54a: Plan a second traveling path moving around the obstacle according to the obstacle information collected in a supplementary manner and collected previously, and move around the obstacle along the second traveling path.

55a: Continuously use the structured light module to collect obstacle information during the process of moving around the obstacle so as to obtain complete information of the obstacle.

56a: Mark the complete information of the obstacle in an environmental map, the obstacle being an obstacle corresponding to the obstacle information collected in a supplementary manner and collected previously.

In the embodiments of the present disclosure, the autonomous mobile device may obtain rough contour information of an obstacle according to obstacle information detected during a normal traveling process and obstacle information within the blind area range collected in a supplementary manner during the process of executing the omission remediation action. Based on this, a second traveling path surrounding the obstacle may be planned, and the autonomous mobile device travels around the obstacle along the second traveling path. Further, during the process of the autonomous mobile device traveling around the obstacle, the structured light module may be continuously used to collect obstacle information so as to obtain complete information of the obstacle, and the collected complete information of the obstacle may be marked in an environmental map for constructing environmental maps or updating existing environmental maps.

Figure 5B:
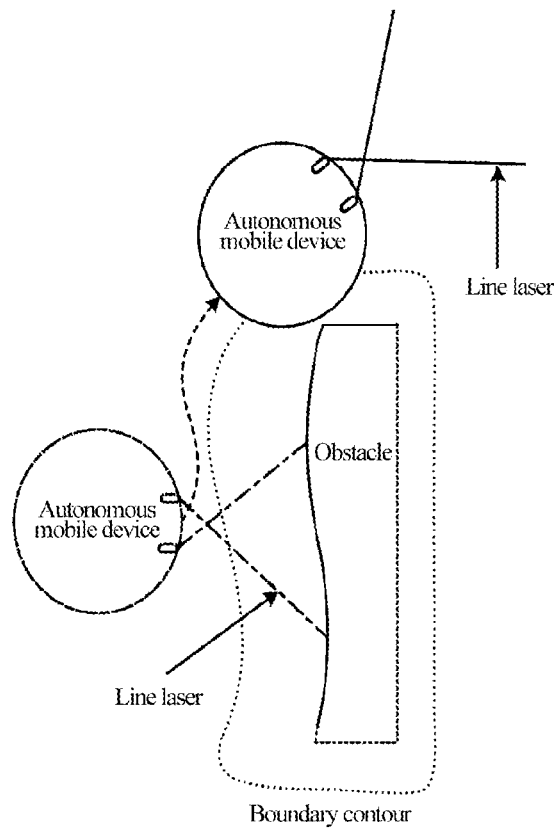
FIG. 5b is a schematic diagram of a process of an autonomous mobile device traveling around an obstacle according to an embodiment of the present disclosure.

In the embodiments of the present disclosure, the implementation of planning, by the autonomous mobile device, a second traveling path surrounding the obstacle according to the obstacle information collected in a supplementary manner and collected previously is not limited. In an optional embodiment, collected points on the obstacle may be determined according to the obstacle information collected in a supplementary manner and collected previously, and the collected points on the obstacle may be expanded. A boundary contour of the obstacle is determined based on the expanded points on the obstacle, and a second traveling path surrounding the obstacle is planned according to the boundary contour. For example, in an example where the autonomous mobile device differentially rotates to collect, in a supplementary manner, obstacle information within the blind area range, the autonomous mobile device determines collected points, i.e. points on solid lines in FIG. 3d, on the obstacle according to the obstacle information collected in a supplementary manner and collected previously, expands the collected points on the obstacle, and determines a boundary contour of the obstacle based on the expanded points on the obstacle, i.e. a boundary contour line as shown in FIG. 5b. Further, the autonomous mobile device plans a second traveling path according to the determined boundary contour line of the obstacle, i.e. an arrowed curve in FIG. 5b. The autonomous mobile device continuously travels along the second traveling path.

In the embodiments of the present disclosure, the manner of planning a second traveling path surrounding the obstacle by the autonomous mobile device is not limited. The autonomous mobile device may plan a second traveling path and then travel along the planned second traveling path, or may plan a second traveling path while traveling. This is not limited herein. In the embodiments of the present disclosure, the manner in which the autonomous mobile device selects the direction of the second traveling path is not limited. The autonomous mobile device may determine a side where the boundary of the obstacle is detected for the first time as the direction of the second traveling path, or may select one side as the direction of the second traveling path after detecting boundaries of both sides of the obstacle through the omission remediation action, or may select a side easily passing the obstacle as the direction of the second traveling path according to surrounding environmental information of the boundaries of both sides of the obstacle. This is not limited herein.

Figure 5C:
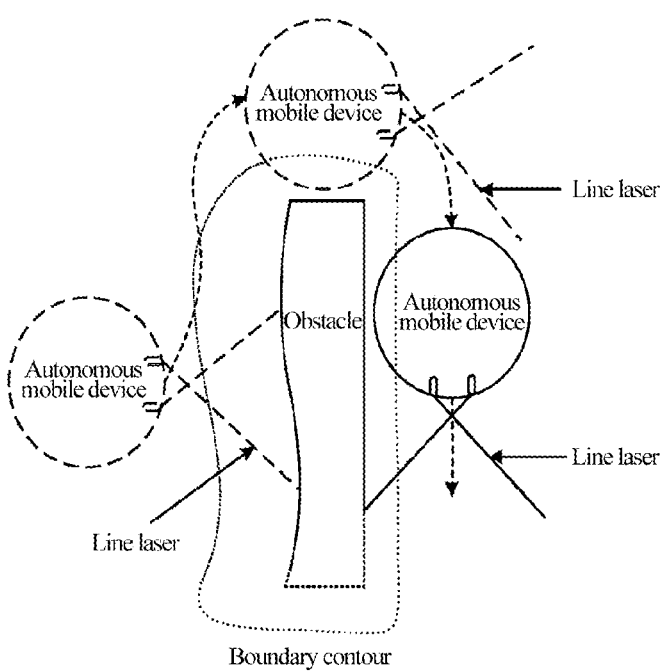
FIG. 5c is a schematic diagram of another process of an autonomous mobile device traveling around an obstacle according to an embodiment of the present disclosure.

Further, in order to ensure that the autonomous mobile device does not "scrape" the obstacle during the process of traveling around the obstacle in the edgewise mode, the autonomous mobile device may continuously detect the obstacle using the structured light module during the traveling process, update the second traveling path planned based on the boundary contour of the obstacle at any time according to the detected obstacle information, and adjust the traveling direction. As shown in FIG. 5c, when the autonomous mobile device travels to the boundary of the obstacle and cannot detect obstacle information in a forward direction thereof, the autonomous mobile device may continuously execute an omission remediation action until the obstacle information is detected, and update a second traveling path planned based on the boundary contour of the obstacle according to the detected obstacle information to obtain a new second traveling path, as shown by an arrowed curve in FIG. 5c. Further, the autonomous mobile device may adjust the direction according to the updated second traveling path, achieve the purpose of traveling around the obstacle, and continuously travel along the obstacle in the right edgewise mode. When reaching the other boundary of the obstacle, the autonomous mobile device may adjust the direction in the same way, and continuously travel along the obstacle in the right edgewise mode until an origin of traveling along the second traveling path is reached, thereby surrounding the obstacle. Further, after the autonomous mobile device travels around the obstacle along the second traveling path for one turn, complete obstacle information may be collected, an environmental map may be constructed based on the collected complete obstacle information, or an existing environmental map may be updated, so as to provide a foundation for subsequent working and obstacle avoidance.

Scenario Embodiment 3

In this scenario embodiment, for example, the autonomous mobile device is a floor sweeping robot that is provided with a structured light module. The implementation structure of the structured light module is as shown in FIG. 1a or FIG. 1b. When the floor sweeping robot executes a sweeping task, the structured light module may be used to collect obstacle information in a forward direction, and obstacle avoidance is performed based on the collected obstacle information. The process in which the floor sweeping robot executes a sweeping task will be described below with reference to FIG. 6a.

Figure 6A:
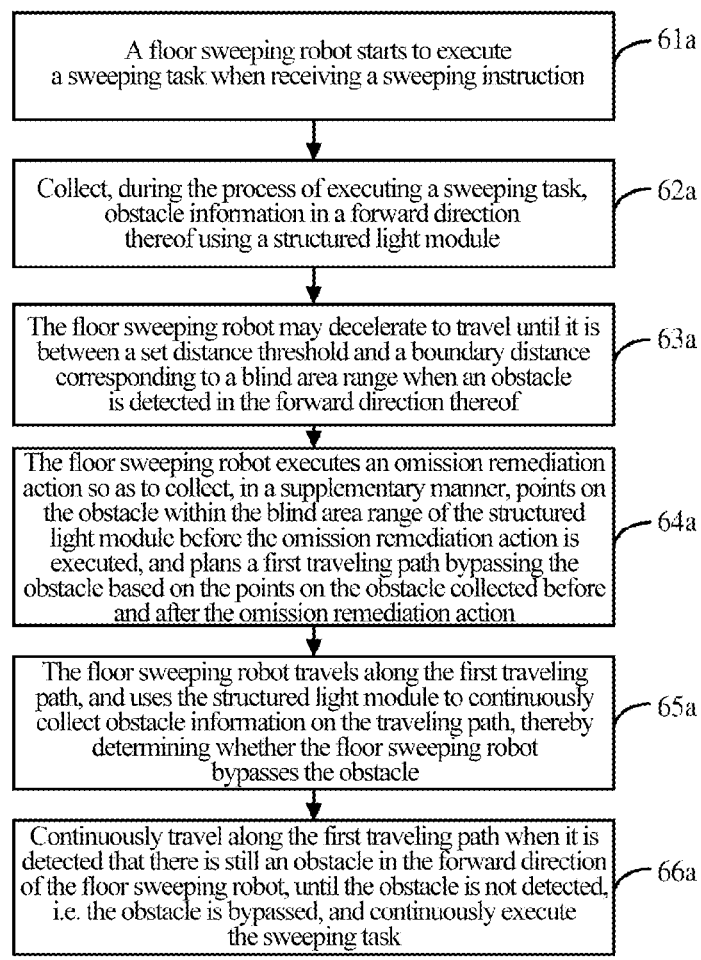
FIG. 6a is a schematic flowchart of a floor sweeping robot performing a sweeping task according to an embodiment of the present disclosure.

As shown in FIG. 6a, the process in which the floor sweeping robot executes a sweeping task includes the following steps:

Step 61a: The floor sweeping robot starts to execute a sweeping task when receiving a sweeping instruction.

Step 62a: Collect, during the process of executing a sweeping task, obstacle information in a forward direction thereof using a structured light module.

Step 63a: The floor sweeping robot may decelerate to travel until it is between a set distance threshold and a boundary distance corresponding to a blind area range when an obstacle is detected in the forward direction thereof.

Step 64a: The floor sweeping robot executes an omission remediation action so as to collect, in a supplementary manner, points on the obstacle within the blind area range of the structured light module before the omission remediation action is executed, and plans a first traveling path bypassing the obstacle based on the points on the obstacle collected before and after the omission remediation action.

Step 65*a*: The floor sweeping robot travels along the first traveling path, and uses the structured light module to continuously collect obstacle information on the traveling path, thereby determining whether the floor sweeping robot bypasses the obstacle.

Step 66*a*: Continuously travel along the first traveling path when it is detected that there is still an obstacle in the forward direction of the floor sweeping robot, until the obstacle is not detected, i.e. the obstacle is bypassed, and continuously execute the sweeping task.

In the present embodiment, the floor sweeping robot may execute a sweeping task after receiving a sweeping instruction, and use, during the process of the sweeping task, the structured light module to continuously detect whether there is an obstacle in the forward direction thereof. When the obstacle is detected in the forward direction thereof, the floor sweeping robot may travel between a set distance threshold and a boundary distance corresponding to a blind area range, i.e. outside the blind area range of the structured light module, and execute an omission remediation action for the blind area range of the structured light module. In the present embodiment, the manner in which the floor sweeping robot executes an omission remediation action is not limited. The floor sweeping robot may adopt any omission remediation action manner in the above-mentioned embodiments to collect, in a supplementary manner, the obstacle information within the blind area of the structured light module, and the specific process of executing the omission remediation action may be seen in the above-mentioned embodiments and will not be described in detail herein.

Further, the floor sweeping robot may determine points on the obstacle according to the obstacle information collected in a supplementary manner and collected previously, expand the collected points on the obstacle, and determine a boundary contour of the obstacle based on the expanded points on the obstacle. Further, according to the boundary contour, the floor sweeping robot may plan a first traveling path bypassing the obstacle. The specific manner of expanding the points on the obstacle and planning the first traveling path may be seen in the content of the corresponding embodiment of FIG. 4*b*.

Further, the floor sweeping robot may travel along the first traveling path after determining the traveling direction, and continuously detect obstacle information using the structured light module during the traveling process, so as to determine whether the floor sweeping robot bypasses the obstacle. Since the distance between the first traveling path along which the floor sweeping robot travels and the obstacle is less than an effective range of the floor sweeping robot, the floor sweeping robot may continuously detect the obstacle during the traveling process. When the floor sweeping robot travels to the boundary of the obstacle and no obstacle information is detected in the forward direction thereof, it is indicated that the distance between the floor sweeping robot and the obstacle has exceeded the effective range of the floor sweeping robot, i.e. the floor sweeping robot has bypassed the obstacle at this moment. Further, the floor sweeping robot may continuously travel in the forward direction thereof to execute a sweeping task. If the floor sweeping robot may continuously detect the obstacle during the traveling process, it is indicated that the obstacle is still within the effective range of the floor sweeping robot, i.e. the floor sweeping robot has not bypassed the obstacle. Therefore, the floor sweeping robot may continuously travel along the first traveling path and continuously detect the obstacle until no obstacle is detected in the forward direction thereof, i.e. the floor sweeping robot has reached the boundary of the obstacle and bypassed the obstacle. Then, the floor sweeping robot may continuously travel in the forward direction thereof to execute a sweeping task.

Scenario Embodiment 4

In this scenario embodiment, for example, the autonomous mobile device is a floor sweeping robot that is provided with a structured light module. The implementation structure of the structured light module is as shown in FIG. 1*a* or FIG. 1*b*. The floor sweeping robot may use a structured light module to collect obstacle information in a forward direction during the process of executing a sweeping task. On the one hand, obstacle avoidance is performed based on the collected obstacle information. On the other hand, an environmental map may be constructed according to the collected obstacle information when the environmental map has not been constructed or when the obstacle information does not exist on the environmental map. The process in which the floor sweeping robot executes a sweeping task while constructing an environmental map will be described below with reference to FIG. 6*b*.

Figure 6B:
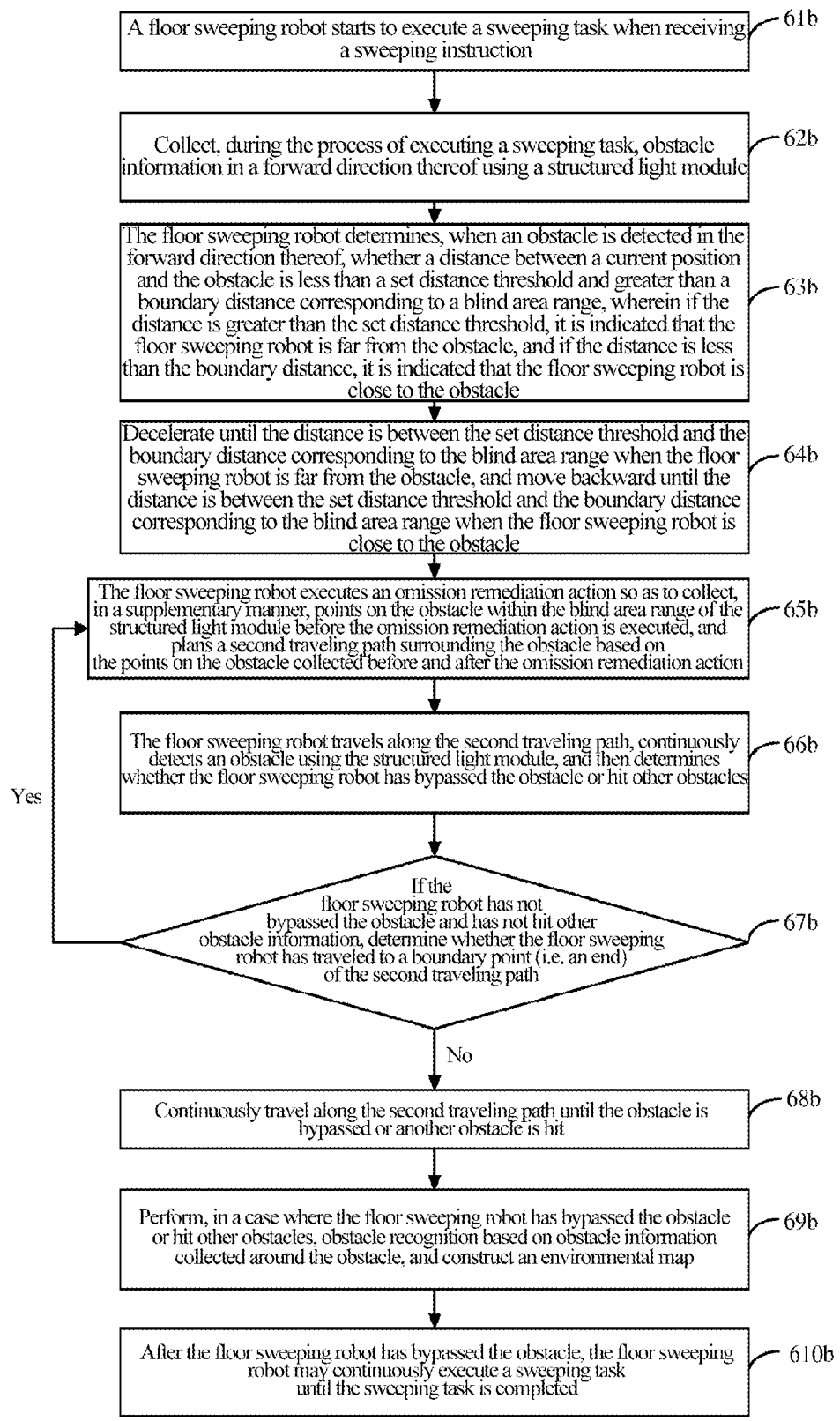
FIG. 6b is a schematic flowchart of constructing an environmental map while performing a sweeping task by a sweeping robot according to an embodiment of the present disclosure.

As shown in FIG. 6*b*, the process in which the floor sweeping robot executes a sweeping task while constructing an environmental map includes the following steps:

Step 61*b*: The floor sweeping robot starts to execute a sweeping task when receiving a sweeping instruction.

Step 62*b*: Collect, during the process of executing a sweeping task, obstacle information in a forward direction thereof using a structured light module.

Step 63*b*: The floor sweeping robot determines, when an obstacle is detected in the forward direction thereof, whether a distance between a current position and the obstacle is less than a set distance threshold and greater than a boundary distance corresponding to a blind area range. If the distance is greater than the set distance threshold, it is indicated that the floor sweeping robot is far from the obstacle. If the distance is less than the boundary distance, it is indicated that the floor sweeping robot is close to the obstacle.

Step 64*b*: Decelerate until the distance is between the set distance threshold and the boundary distance corresponding to the blind area range when the floor sweeping robot is far from the obstacle, and move backward until the distance is between the set distance threshold and the boundary distance corresponding to the blind area range when the floor sweeping robot is close to the obstacle.

Step 65*b*: The floor sweeping robot executes an omission remediation action so as to collect, in a supplementary manner, points on the obstacle within the blind area range of the structured light module before the omission remediation action is executed, and plans a second traveling path surrounding the obstacle based on the points on the obstacle collected before and after the omission remediation action.

Step 66*b*: The floor sweeping robot travels along the second traveling path, continuously detects an obstacle using the structured light module, and then determines whether the floor sweeping robot has bypassed the obstacle or hit other obstacles.

Step 67*b*: If the floor sweeping robot has not bypassed the obstacle and has not hit other obstacle information, determine whether the floor sweeping robot has traveled to a boundary point (i.e. an end) of the second traveling path, if yes, re-perform step 65*b*, and if no, perform step 68*b*.

Step 68*b*: Continuously travel along the second traveling path until the obstacle is bypassed or another obstacle is hit, and proceed to step 69*b*.

Step 69*b*: Perform, in a case where the floor sweeping robot has bypassed the obstacle or hit other obstacles, obstacle recognition based on obstacle information collected around the obstacle, and construct an environmental map.

Step 610*b*: After the floor sweeping robot has bypassed the obstacle, the floor sweeping robot may continuously execute a sweeping task until the sweeping task is completed.

In the present embodiment, the floor sweeping robot may execute a sweeping task after receiving a sweeping instruction, and use, during the process of the sweeping task, the structured light module to continuously detect whether there is an obstacle in the forward direction thereof. When an obstacle is detected in the forward direction thereof, the floor sweeping robot determines whether a distance between a current position and the obstacle is suitable for executing an omission remediation action for the blind area range of the structured light module. If the floor sweeping robot determines that the current position is far away from the obstacle, it is indicated that the omission remediation action is not suitable for execution or the effect of executing the omission remediation action is poor, and the floor sweeping robot may continuously travel to a suitable position between the set distance threshold and the boundary distance corresponding to the blind area range, and then execute the omission remediation action for the blind area range of the structured light module. If the floor sweeping robot determines that the current position is close to the obstacle, it is also indicated that the omission remediation action is not suitable for execution or the effect of executing the omission remediation action is poor, and the floor sweeping robot may move back to a suitable position between the set distance threshold and the boundary distance corresponding to the blind area range, and then execute the omission remediation action for the blind area range of the structured light module.

In the present embodiment, the manner in which the floor sweeping robot executes an omission remediation action is not limited. The floor sweeping robot may adopt any omission remediation action manner in the above-mentioned embodiments to collect, in a supplementary manner, the obstacle information within the blind area of the structured light module, and the specific process of executing the omission remediation action may be seen in the above-mentioned embodiments and will not be described in detail herein.

Further, the floor sweeping robot may obtain rough contour information of the obstacle according to the obstacle information collected in a supplementary manner and collected previously, expand the collected points on the obstacle, and determine a boundary contour of the obstacle based on the expanded points on the obstacle. Further, according to the boundary contour, the floor sweeping robot may plan a second traveling path surrounding the obstacle. The specific manner of expanding the points on the obstacle and planning the second traveling path may be seen in the content of the corresponding embodiment of FIG. 5*b*.

Further, the floor sweeping robot may travel along the second traveling path, and continuously detect obstacle information using the structured light module during the traveling process, so as to determine whether the floor sweeping robot has bypassed the obstacle. If the obstacle may be continuously detected in the forward direction of the floor sweeping robot during the traveling process, it is indicated that the floor sweeping robot has not bypassed the obstacle, and therefore the floor sweeping robot continuously travels along a second traveling trajectory and uses the structured light module to continuously detect the obstacle. If an obstacle is not detected in the forward direction of the floor sweeping robot during the process of traveling along the second traveling path, it is indicated that the floor sweeping robot has reached the boundary of the obstacle at this moment, and it is considered that the obstacle has been bypassed. In this process, the floor sweeping robot may also determine whether the robot has traveled to a boundary point of the second path. If the obstacle has not been bypassed when traveling to the boundary point of the second path, the omission remediation action may be executed again, and a new second traveling path may be re-planned. The robot may continuously travel along the new second traveling path until the obstacle is bypassed, so as to obtain complete obstacle information, and an environmental map is constructed based on the complete obstacle information. It is to be described herein that the execution order of steps 69*b* and 610*b* is not limited in the present embodiment. For example, after an obstacle is bypassed, a sweeping task may be continuously executed, and an environmental map is constructed or updated according to the collected complete obstacle information after the sweeping task ends; or after an obstacle is bypassed, an environmental map is constructed or updated according to the complete obstacle information, and the sweeping task is continuously executed after the environmental map is constructed or updated; or after an obstacle is bypassed, the sweeping task is continuously executed while an environmental map is constructed or updated according to the collected complete obstacle information.

Further, if the floor sweeping robot hits another obstacle during the traveling process, the obstacle may also be detected and information of the obstacle may be collected. Then, an environmental map is constructed based on obstacle information collected by surrounding the obstacle and information collected by detecting other obstacles, and a foundation is provided for subsequent working task execution and obstacle avoidance. In the present embodiment, the detection manner of the floor sweeping robot after hitting other obstacles during traveling around the obstacle is not limited, and the floor sweeping robot may perform flexible processing according to a specific working environment. For example, in the case of a wide working environment, the floor sweeping robot may detect around another obstacle after the completion of traveling around a current obstacle. In the case of hitting another obstacle, it is also possible to detect around another obstacle before detecting around the previous obstacle. In the case of hitting another obstacle, it is also possible to detect the obstacle and bypass the obstacle according to the detection result. Or, in the case of a narrow working environment, if the floor sweeping robot cannot continuously travel after hitting other obstacles while traveling around the current obstacle, an alarm may be given to a user, for example, by blinking an indicator light, buzzing an alarm, outputting a voice, sending a prompt message to a user terminal, etc. Further, when the floor sweeping robot detects the obstacle information, the sweeping task may be continued until the task ends.

In the embodiments of the present disclosure, an autonomous mobile device can collect environmental information by means of a structured light module, and can collect, in a supplementary manner, obstacle information within a blind area range of the structured light module by executing an omission remediation action, such that the autonomous mobile device detects richer and more accurate environmental information during a task execution process, thereby avoiding omitting information of lower obstacles. Further, the obstacles can be avoided and an environmental map can be constructed according to the detected obstacle information, thereby providing a foundation for subsequent working task execution and obstacle avoidance.

It is to be noted that the executive bodies of the steps of the method provided by the above-mentioned embodiments may all be the same device, or the executive bodies of the method may also be different devices. For example, the executive body of steps 31a to 33a may be device A. For another example, the executive body of steps 31a and 32a may be device A, and the executive body of step 3a may be device B, etc.

In addition, in some of the processes described in the above-mentioned embodiments and in the accompanying drawings, multiple operations appearing in a particular order are included. However, it is to be clearly understood that these operations may be performed out of the order in which they appear herein or in parallel. The numbering of the operations, such as 61a and 62a, merely serves to distinguish one operation from another. The numbering does not represent any order of execution. In addition, these processes may include more or fewer operations, and these operations may be performed in sequence or in parallel. It is to be noted that the description of "first", "second", etc. herein is intended to distinguish between different messages, devices, modules, etc., does not represent a sequential order, and does not limit "first" and "second" to be of different types.

Figure 7:
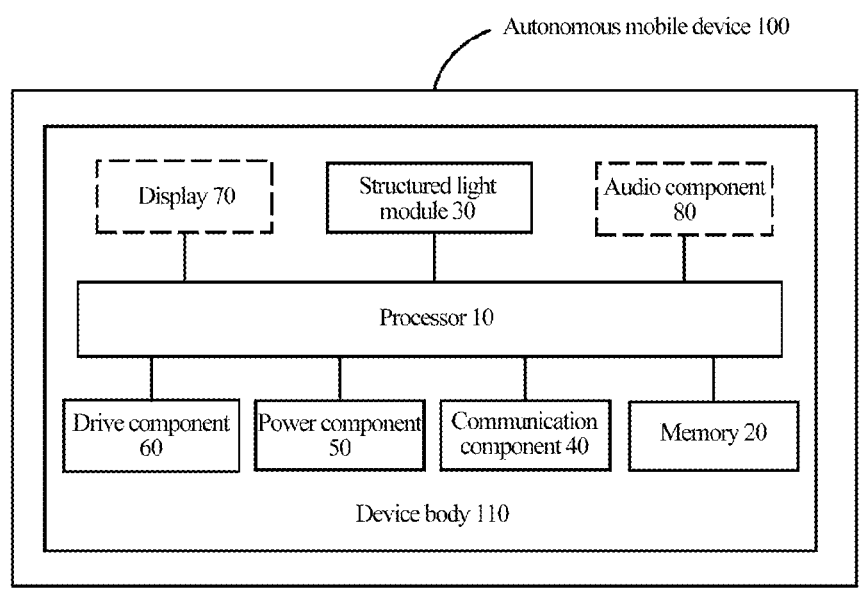
FIG. 7 is a schematic structural diagram of an autonomous mobile device according to an embodiment of the present disclosure.

FIG. 7 is a schematic structural diagram of an autonomous mobile device 100 according to an embodiment of the present disclosure. The autonomous mobile device 100 according to an embodiment of the present disclosure may be any mechanical device capable of autonomously moving in an environment where the device is located, such as a robot, a purifier, or an unmanned aerial vehicle. The robot may include a floor sweeping robot, a glass cleaning robot, a home accompanying robot, a guest greeting robot, an autonomous service robot, etc.

As shown in FIG. 7, the autonomous mobile device 100 includes: a device body 110. The device body 110 is provided with a processor 10, and a memory 20 storing computer instructions. There may be one or more processors 10 and memories 20, which may be arranged inside the device body 110 or may be arranged on the surface of the device body 110.

The device body 110 is an actuator of the autonomous mobile device 100 and may perform operations specified by the processor 10 in a certain environment. The device body 110 reflects the appearance of the autonomous mobile device 100 to some extent. In the present embodiment, the appearance of the autonomous mobile device 100 is not limited. Certainly, the shape of the autonomous mobile device 100 may vary depending on different implementation forms of the autonomous mobile device 100. Taking an outer contour shape of the autonomous mobile device 100 as an example, the outer contour shape of the autonomous mobile device 100 may be an irregular shape or some regular shapes. For example, the outer contour shape of the autonomous mobile device 100 may be a regular shape such as a circle, an ellipse, a square, a triangle, a drop shape, or a D shape. Shapes other than the regular shape are referred to as irregular shapes. For example, the outer contour of a humanoid robot and the outer contour of an unmanned aerial vehicle, etc. belong to the irregular shapes.

The memory 20 is mainly configured to store computer programs that are executable by the processor 10 to cause the processor 10 to control the autonomous mobile device 100 to realize corresponding functions and fulfill corresponding actions or tasks. In addition to storing the computer programs, the memory 20 may also be configured to store various other data to support operations on the autonomous mobile device 100. Examples of such data include instructions for any application or method operating on the autonomous mobile device 100, and an environmental map corresponding to an environment where the autonomous mobile device 100 is located. The environmental map may be one or more maps corresponding to the entire environment stored in advance, or may be a partial map that is being constructed before.

The memory 20 may be implemented by any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

In the embodiments of the present disclosure, the implementation form of the processor 10 is not limited, and may be, for example but not limited to, CPU, GPU or MCU, etc. The processor 10, which may be viewed as a control system for the autonomous mobile device 100, may be configured to execute the computer programs stored in the memory 20 to control the autonomous mobile device 100 to realize corresponding functions and fulfill corresponding actions or tasks. It is to be noted that according to different implementation forms and scenarios of the autonomous mobile device 100, the functions to be realized and the actions or tasks to be completed thereby will be different. Accordingly, the computer programs stored in the memory 20 may be different, while the processor 10 executes different computer programs to control the autonomous mobile device 100 to realize different functions and fulfill different actions or tasks.

In some optional embodiments, as shown in FIG. 7, the autonomous mobile device 100 may also include: a communication component 40, a power component 50, a drive component 60, and other components. Only some components are shown schematically in FIG. 7. This does not mean that the autonomous mobile device 100 includes only the components shown in FIG. 7. The drive component 50 may include a drive wheel, a drive motor, a universal wheel, etc. Further optionally, for different application requirements, the autonomous mobile device 100 may also include a display 70, an audio component 80 and other components, which are illustrated with dashed boxes in FIG. 7. It is to be understood that the components within the dashed boxes are optional, rather than required, depending on the product form of the autonomous mobile device 100. If the autonomous mobile device 100 is a floor sweeping robot, the autonomous mobile device 100 may also include a dust collection bucket and a floor brush component, etc. which will not be described much herein.

In the present embodiment, the autonomous mobile device 100 may move autonomously and may fulfill certain working tasks based on autonomous movement under the control of the processor 10. For example, in a shopping scenario such as a supermarket and a mall, a shopping cart robot needs to follow the movement of customers to accommodate goods chosen by the customers. For another example, in warehousing sorting scenarios for some companies, a sorting robot needs to follow sorting personnel to move to a shelf pick area and then begin sorting order goods. For another example, in a home sweeping scenario, a floor sweeping robot needs to sweep an area such as a living room, a bedroom or a kitchen. In these application scenarios, the autonomous mobile device 100 needs to rely on surrounding environmental information for autonomous movement.

Further, as shown in FIG. 7, the device body 110 is also provided with a structured light module 30 having a structure as shown in FIG. 1a for collecting surrounding environmental information of the autonomous mobile device 100. The structured light module 30 includes: a camera module 31 and line laser sensors 32 distributed on both sides of the camera module 31. The detailed introduction of the structured light module 30 may be seen in the above-mentioned embodiments and will be omitted herein.

In the embodiments of the present disclosure, the processor 10, when executing the computer program in the memory 20, is configured to: collect obstacle information within a front area using the structured light module 30 during a traveling process of the autonomous mobile device 100; control the autonomous mobile device 100 to execute, outside a blind area range of the structured light module 30, an omission remediation action for the blind area range in a case where the structured light module 30 has collected the obstacle information; and collect, in a supplementary manner, obstacle information within the blind area range using the structured light module 30 during the process of executing the omission remediation action.

In an optional embodiment, when controlling the autonomous mobile device 100 to execute, outside a blind area range of the structured light module 30, an omission remediation action for the blind area range, the processor 10 is configured to: calculate a distance between the autonomous mobile device 100 and an obstacle according to the obstacle information collected by the structured light module 30; and control the autonomous mobile device 100 to execute an omission remediation action for the blind area range when the distance is between a set distance threshold and a boundary distance corresponding to the blind area range. The set distance threshold is greater than the boundary distance.

In an optional embodiment, in a case where the distance between the autonomous mobile device 100 and the obstacle is greater than or equal to the set distance threshold, the processor 10 controls the autonomous mobile device 100 to continuously move toward the obstacle until the distance is between the set distance threshold and the boundary distance; or in a case where the distance between the autonomous mobile device 100 and the obstacle is less than the boundary distance, the processor 10 controls the autonomous mobile device 100 to move backward away from the obstacle until the distance is between the set distance threshold and the boundary distance.

In an optional embodiment, the processor 10, when controlling the autonomous mobile device 100 to continuously move toward the obstacle, is configured to: control the autonomous mobile device 100 to continuously move toward the obstacle in a deceleration manner; or control the autonomous mobile device 100 to continuously move toward the obstacle in a uniform velocity manner.

In an optional embodiment, when controlling the autonomous mobile device 100 to execute, outside a blind area range of the structured light module 30, an omission remediation action for the blind area range, the processor 10 is configured to:

control the autonomous mobile device 100 to rotate in situ outside the blind area range of the structured light module 30;

control the autonomous mobile device 100 to rotate differentially outside the blind area range of the structured light module 30; or, control the autonomous mobile device 100 to move in multiple directions outside the blind area range of the structured light module 30; or, control the autonomous mobile device 100 to move in another direction different from a current traveling direction outside the blind area range of the structured light module 30.

In an optional embodiment, after collecting, in a supplementary manner, obstacle information within the blind area range using the structured light module 30, the processor 10 is also configured to: perform obstacle avoidance according to the obstacle information collected in a supplementary manner and collected previously; and/or, construct an environmental map according to the obstacle information collected in a supplementary manner and collected previously.

In an optional embodiment, the processor 10, when performing obstacle avoidance according to the obstacle information collected in a supplementary manner and collected previously, is configured to: plan a first traveling path bypassing an obstacle according to the obstacle information collected in a supplementary manner and collected previously; and control the autonomous mobile device 100 to continuously travel along the first traveling path until the obstacle is bypassed. The obstacle is an obstacle corresponding to the obstacle information collected in a supplementary manner and collected previously.

In an optional embodiment, the processor 10, when planning a first traveling path bypassing an obstacle according to the collected obstacle information, is configured to: determine collected points on the obstacle according to the obstacle information collected in a supplementary manner and collected previously, and expand the collected points on the obstacle; and determine a boundary contour of the obstacle based on the expanded points on the obstacle, and plan a first traveling path bypassing the obstacle according to the boundary contour.

In an optional embodiment, the processor 10, when constructing an environmental map according to the obstacle information collected in a supplementary manner and collected previously, is configured to: plan a second traveling path moving around the obstacle according to the obstacle information collected in a supplementary manner and collected previously, and control the autonomous mobile device 100 to move around the obstacle along the second traveling path; continuously use the structured light module 30 to collect obstacle information during the process of the autonomous mobile device 100 moving around the obstacle so as to obtain complete information of the obstacle; and mark the complete information of the obstacle in an environmental map. The obstacle is an obstacle corresponding to the obstacle information collected in a supplementary manner and collected previously.

In an optional embodiment, the processor 10, when planning a second traveling path moving around the obstacle according to the obstacle information collected in a supplementary manner and collected previously, is configured to: determine collected points on the obstacle according to the collected obstacle information, and expand the collected points on the obstacle; and determine a boundary contour of the obstacle based on the expanded points on the obstacle, and determine a second traveling path surrounding the obstacle according to the boundary contour and an edgewise mode of the autonomous mobile device 100.

The autonomous mobile device according to an embodiment of the present disclosure may be any mechanical device capable of autonomously moving in an environment where the device is located, such as a robot, a purifier, or an unmanned aerial vehicle. The robot may include, but are not limited to, a floor sweeping robot, a glass cleaning robot, a home accompanying robot, a guest greeting robot, an autonomous service robot, etc.

Accordingly, an embodiment of the present disclosure also provides a computer-readable storage medium storing a computer program. The computer program, when executed by a processor, causes the processor to implement at least the following actions: collecting obstacle information within a front area using a structured light module during a traveling process of an autonomous mobile device; executing, outside a blind area range of the structured light module, an omission remediation action for the blind area range in a case where the structured light module has collected the obstacle information; and collecting, in a supplementary manner, obstacle information within the blind area range using the structured light module during the process of executing the omission remediation action.

The communication component in FIG. 7 is configured to facilitate wired or wireless communication between a device where the communication component is located and other devices. The device where the communication component is located may access a wireless network based on a communication standard, e.g. a mobile communication network such as WiFi, 2G, 3G, 4G/LTE, or 5G, or a combination thereof. In one exemplary embodiment, the communication component receives a broadcast signal or broadcast-related information from an external broadcast management system via a broadcast channel. In one exemplary embodiment, the communication component may also include a near field communication (NFC) module, a radio frequency identification (RFID) technology, an infrared data association (IrDA) technology, an ultra wide band (UWB) technology, a Bluetooth (BT) technology, etc.

The display in FIG. 7 includes a screen, which may include a liquid crystal display (LCD) and a touch panel (TP). If the screen includes a touch panel, the screen may be implemented as a touch screen to receive an input signal from a user. The touch panel includes one or more touch sensors to sense touches, slides, and gestures on the touch panel. The touch sensor may not only sense the boundary of a touch or slide action, but also detect the duration and pressure associated with the touch or slide operation.

The power component in FIG. 7 supplies power to various components of a device where the power component is located. The power component may include a power management system, one or more power supplies, and other components associated with generating, managing, and distributing power for the device where the power component is located.

The audio component in FIG. 7 may be configured to output and/or input an audio signal. For example, the audio component includes a microphone (MIC) configured to receive an external audio signal when a device where the audio component is located is in an operational mode, such as a call mode, a recording mode, and a speech recognition mode. The received audio signal may be further stored in the memory or transmitted via the communication component. In some embodiments, the audio component also includes a speaker for outputting the audio signal.

Those skilled in the art will appreciate that the embodiments of the present disclosure may be provided as a method, a system, or a computer program product. Therefore, the present disclosure may take the form of an entirely hardware embodiment, an entirely software embodiment, or an embodiment combining software and hardware. Moreover, the present disclosure may take the form of a computer program product implemented on one or more computer available storage media (including, but not limited to, a disk memory, a CD-ROM, an optical memory, etc.) containing computer available program codes.

The present disclosure is described with reference to flowcharts and/or block diagrams of the method, the device (system), and the computer program product according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general purpose computer, a special purpose computer, an embedded processor, or processors of other programmable data processing devices to generate a machine, whereby an apparatus for achieving functions designated in one or more flows of the flowcharts and/or one or more blocks of the block diagrams is generated via instructions executed by the computers or the processors of the other programmable data processing devices.

These computer program instructions may also be stored in a computer-readable memory capable of guiding the computers or the other programmable data processing devices to operate in a specific mode, whereby a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, whereby processing implemented by the computers is generated by executing a series of operation steps on the computers or the other programmable devices. Thus, the instructions executed on the computers or the other programmable devices provide a step of achieving the functions designated in one or more flows of the flowcharts and/or one or more blocks of the block diagrams.

In a typical configuration, a computing device includes one or more central processing units (CPUs), an input/output interface, a network interface, and a memory.

The memory may include a non-persistent memory, a random access memory (RAM), a non-volatile memory, and/or other forms in a computer-readable medium, such as a read only memory (ROM) or a flash RAM. The memory is an example of a computer-readable medium.

The computer-readable medium includes non-volatile and volatile, removable and non-removable media. Information may be stored in any way or by any technology. Information may be computer-readable instructions, data structures, modules of programs, or other data. Examples of a computer storage medium include, but are not limited to, a phase-change random access memory (PRAM), a static random access memory (SRAM), a dynamic random access memory (DRAM), other types of RAMs, a ROM, an electrically erasable programmable read-only memory (EEPROM), a flash memory or other memory technologies, a CD-ROM, a digital versatile disc (DVD) or other optical memories, a cassette tape, a tape and disk memory or other magnetic memories or any other non-transport media. The non-volatile storage medium may be used for storing computing device-accessible information. As defined herein, the computer-readable medium does not include computer-readable transitory media, such as modulated data signals and carrier waves.

It is also to be noted that the terms "including", "containing" or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

Those skilled in the art will appreciate that the embodiments of the present disclosure may be provided as a method, a system, or a computer program product. Therefore, the present disclosure may take the form of an entirely hardware embodiment, an entirely software embodiment, or an embodiment combining software and hardware. Moreover, the present disclosure may take the form of a computer program product implemented on one or more computer available storage media (including, but not limited to, a disk memory, a CD-ROM, an optical memory, etc.) containing computer available program codes.

The above description is merely the embodiments of the present disclosure and is not intended to limit the present disclosure. Various modifications and variations of the present disclosure will occur to those skilled in the art. Any modifications, equivalent replacements, improvements, etc. that come within the spirit and principles of the present disclosure are intended to be within the scope of the claims appended hereto.

What is claimed is:

1. An autonomous mobile device, comprising: a device body, the device body being provided with a structured light module, a processor, and a memory storing a computer program; wherein,
the processor is configured to execute the computer program for:
collecting obstacle information within a front area using a structured light module during a traveling process of the autonomous mobile device;
controlling the autonomous mobile device to execute, outside a blind area range of the structured light module, an omission remediation action for the blind area range when the structured light module has collected the obstacle information; and
collecting, in a supplementary manner, obstacle information within the blind area range using the structured light module during the process of executing the omission remediation action;
wherein the processor, when controlling the autonomous mobile device to execute the omission remediation action, is configured to:
calculate a distance between the autonomous mobile device and an obstacle according to the obstacle information collected by the structured light module; and
control the autonomous mobile device to execute the omission remediation action for the blind area range when the distance is between a set distance threshold and a boundary distance corresponding to the blind area range, the set distance threshold being greater than the boundary distance.

2. The autonomous mobile device according to claim 1, wherein the processor, when controlling the autonomous mobile device to execute an omission remediation action, is configured to:
control the autonomous mobile device to rotate in situ outside the blind area range of the structured light module;
or,
control the autonomous mobile device to rotate differentially outside the blind area range of the structured light module;
or,
control the autonomous mobile device to move in multiple directions outside the blind area range of the structured light module;
or,
control the autonomous mobile device to move in another direction different from a current traveling direction outside the blind area range of the structured light module.

3. The autonomous mobile device according to claim 1, wherein the processor is further configured to:
perform obstacle avoidance according to the obstacle information collected in a supplementary manner and collected previously;
and/or,
construct an environmental map according to the obstacle information collected in a supplementary manner and collected previously.

4. The autonomous mobile device according to claim 3, wherein the processor, during obstacle avoidance, is configured to:
plan a first traveling path bypassing the obstacle according to the obstacle information collected in a supplementary manner and collected previously; and
control the autonomous mobile device to continuously travel along the first traveling path until the obstacle is bypassed, wherein the obstacle is an obstacle corresponding to the obstacle information collected in a supplementary manner and collected previously.

5. The autonomous mobile device according to claim 3, wherein the processor, when constructing an environmental map, is configured to:
plan a second traveling path moving around the obstacle according to the obstacle information collected in a supplementary manner and collected previously, and control the autonomous mobile device to move around the obstacle along the second traveling path;
continuously use the structured light module to collect obstacle information during the process of the autonomous mobile device moving around the obstacle so as to obtain complete information of the obstacle; and
mark the complete information of the obstacle in an environmental map, wherein the obstacle is an obstacle corresponding to the obstacle information collected in a supplementary manner and collected previously.

* * * * *